(12) United States Patent
Qiu et al.

(10) Patent No.: US 8,546,010 B2
(45) Date of Patent: Oct. 1, 2013

(54) ASSEMBLED BATTERY AND TOROIDAL CELL USED IN THE SAME

(75) Inventors: Xinping Qiu, Beijing (CN); Xi Zheng, Beijing (CN); Jie An, Beijing (CN); Wentao Zhu, Beijing (CN)

(73) Assignee: Tsinghua University, Beijing (CN)

( * ) Notice: Subject to any disclaimer, the term of this patent is extended or adjusted under 35 U.S.C. 154(b) by 238 days.

(21) Appl. No.: 13/057,616

(22) PCT Filed: Oct. 14, 2009

(86) PCT No.: PCT/CN2009/074437
§ 371 (c)(1),
(2), (4) Date: Feb. 4, 2011

(87) PCT Pub. No.: WO2011/006315
PCT Pub. Date: Jan. 20, 2011

(65) Prior Publication Data
US 2011/0135986 A1    Jun. 9, 2011

(30) Foreign Application Priority Data
Jul. 17, 2009   (CN) .......................... 2009 1 0158052

(51) Int. Cl.
*H01M 10/50* (2006.01)
*H01M 2/00* (2006.01)
*H01M 2/08* (2006.01)

(52) U.S. Cl.
USPC ............ 429/120; 429/163; 429/164; 429/182

(58) Field of Classification Search
None
See application file for complete search history.

(56) References Cited

U.S. PATENT DOCUMENTS

| 1,402,956 | A | * | 1/1922 | Politowski ...................... 429/94 |
| 1,436,616 | A | * | 11/1922 | Walsh .............................. 429/69 |
| 2,487,831 | A | * | 11/1949 | Rupp ............................... 429/94 |
| 3,635,766 | A | * | 1/1972 | Quisling ......................... 429/49 |
| 4,262,064 | A | | 4/1981 | Nagle |
| 5,492,779 | A | | 2/1996 | Ronning |
| 5,501,916 | A | | 3/1996 | Teramoto et al. |
| 7,264,902 | B2 | | 9/2007 | Horie et al. |
| 2004/0142237 | A1 | | 7/2004 | Asano |
| 2005/0174092 | A1 | | 8/2005 | Dougherty et al. |
| 2006/0035147 | A1 | | 2/2006 | Lam et al. |

FOREIGN PATENT DOCUMENTS

| CN | 1753205 A | 3/2006 |
| EP | 1705743 A1 | 9/2006 |
| JP | 61110972 A | 5/1986 |
| JP | 2003288863 A | 10/2003 |
| JP | 2007115437 A | 5/2007 |

* cited by examiner

*Primary Examiner* — Cynthia Walls
(74) *Attorney, Agent, or Firm* — The Webb Law Firm

(57) ABSTRACT

An assembled battery with a high capacity, comprising a plurality of unit cells electrically connected with one another in parallel, the unit cells each having a through-hole and being of toroidal shape, and the plurality of unit cells are arranged in a nested manner such that one unit cell is disposed within another unit cell. The problem that toroidal batteries with high capacity, high power density and small thickness may have a large volume and low energy density is solved by connecting in parallel a plurality of unit cells nested within one another, and heat dissipation of the battery is also further improved. A toroidal cell having heat dissipating fins is also provided.

16 Claims, 13 Drawing Sheets

ASSEMBLED BATTERY AND TOROIDAL CELL USED IN THE SAME

FIELD OF THE INVENTION

The invention relates to an assembled battery, and especially to an assembled power battery with a high capacity and high power which is applicable for electric vehicles, intelligent power network and the like. The invention also relates to a toroidal cell that can be used in said assembled battery.

BACKGROUND OF THE INVENTION

Since the beginning of 1990s, appearance and gradual promotion of lithium-ion battery have brought about, to some extent, rapid development of portable devices. In the recent ten years, due to quick improvement in safety and rate performance, power battery can be applied to various fields, such as large electric tools, hybrid motor vehicles and electric motor vehicles, etc., to work with high output torque motor, at least partially taking the place of power system that is dependent completely on combustion engines, which triggers a new round of upsurge in green energy resource.

Currently, due to concern about poor heat dissipation within a high capacity solid power battery, lithium-ion power batteries that have been commercialized in small scale usually have a unit capacity of 8-100 Ah, among which, typical lithium-ion power batteries include: SPIM24300260 100 Ah rectangular lithium-ion power battery from Citic Guoan Mengguli New Energy Science & Technology Co., Ltd., and IMP20/66/148-08PS 8 Ah high-power battery from Phylion Battery (Suzhou) Co., Ltd. Based on these battery cells, a person in the art may increase the voltage and capacity of a battery pack by connecting battery cells in series and in parallel to meet demands in different fields. For example, Beijing Zhongweixintong Science & Technology Co., Ltd. has developed a UPS sample product ZWDY-48/300 which uses a 48V-300 Ah battery pack for telecom field, with the battery pack consisting of power unit cells with a unit capacity of 10 Ah.

EP1705743A1 relates to a battery module having a plurality of unit cells. In the battery module, the unit cells are spaced apart from each other by a predetermined distance and are connected in series or in parallel.

US2005/0174092A1 relates to a battery system for use in a vehicle, which includes a plurality of electrically connected lithium batteries. According to one embodiment, the battery system comprises a module that includes a plurality of (e.g. ten) lithium batteries electrically connected in series. According to another embodiment, the module may be coupled to a wire or a cable via a connector so as to connect the module to another module or to a vehicle electrical system.

Nevertheless, the power output characteristic of the existing solid power battery still cannot fulfill the requirements in some high-level fields, such that engineers could only obtain the desired high power output characteristic by decreasing cell capacity, providing clearance and adopting forced ventilation. A typical example is the electric motor vehicle "Tesla Roadster" produced by the US Tesla Motors, which entered mass production in March, 2008. In order to realize acceleration from rest to a speed of 100 km/h within 4 s, its battery pack uses the currently most mature 18650-type lithium-ion battery cells, and as many as 6831 such 18650-type lithium-ion battery cells are used for each motor vehicle. Obviously, this greatly increases complexity of the power management system, complexity of assembly and maintenance of the battery pack as well as reliability of whole power system.

With further reduction in product cost of power battery products in future years, when the application of power battery products is extended to fields of energy storage and peak regulation in power stations, power network filtering, emergency power for electric locomotive and so on, it is almost impossible to image how to combine cells with a capacity less than 100 Ah together to meet power requirement up to MW level in these fields.

As an improvement, U.S. Pat. No. 5,501,916A discloses a battery cell, wherein a through-hole is provided in the battery core, and a lid forming the battery shell is closely attached, directly or via aluminum plate(s) that are thermally connected to the lid, to at least a part of sidewall of the through-hole in the battery core, thereby heat dissipation within the cell can be improved.

However, it should be noted that, provision of a through-hole as mentioned in the above patent is not the key point for solving the problem of heat dissipation. The key for solving the heat dissipation problem is to limit the maximum thickness of the battery core. Although the maximum thickness of the battery core may be reduced by providing a through-hole, for the cases where the capacity of a battery cell increases up to more than 300 Ah or the maximum thickness of a solid battery core is equal to or greater than 100 mm, due to limitation to the maximum thickness of the battery core imposed by safety and rate performance requirement, simply increasing the diameter or the number of through-holes may solve the problem of heat dissipation within the battery, nevertheless bring about other problems. For example, an increase of through-hole diameter will increase the void (ineffective) volume in the through-hole, resulting in a reduction of energy density and power density of the battery cell and consequently of the entire battery pack, while an increase in number of through-holes will apparently increase manufacture difficulty and cost.

Thus, it is desirable to design a battery product which can not only solve the heat dissipation problem effectively but also has a high capacity, high safety, high energy density and high power density.

SUMMARY OF THE INVENTION

It is an object of the invention to overcome the disadvantages of the power batteries in the prior art as set forth above. This object is achieved by an assembled battery or battery pack with a high capacity according to the invention, said assembled battery comprises a plurality of unit cells electrically connected with one another in parallel, and is characterized in that the plurality of unit cells are arranged in a nested manner such that one unit cell is disposed within another unit cell.

According to an advantageous configuration, each of the plurality of unit cells is a toroidal unit cell having a through-hole, each toroidal unit cell comprising an inner side wall defining the through-hole of the toroidal unit cell, an outer side wall defining an outer circumference of the toroidal unit cell, and a core between the inner side wall and the outer side wall, and the plurality of toroidal unit cells are arranged in a nested manner such that one toroidal unit cell is disposed within the through-hole of another toroidal unit cell.

According to another advantageous configuration, the plurality of unit cells include a solid unit cell, and one or more toroidal unit cells surrounding the solid unit cell and each of the toroidal unit cells having a through-hole, the solid unit cell comprising a core and an outer side wall defining an outer circumference of the solid unit cell, the toroidal unit cell comprising an inner side wall defining the through-hole of the toroidal unit cell, an outer side wall defining an outer circumference of the toroidal unit cell, and a core between the inner side wall and the outer side wall, the solid unit cell and the one or more toroidal unit cells are arranged in a nested manner such that one unit cell is disposed within the through-hole of another unit cell.

According to the invention, the problem that toroidal batteries with high capacity, high power density and small thickness may have a large volume and low energy density is solved by connecting in parallel a plurality of unit cells nested within one another, and heat dissipation of the assembled battery or battery pack is also further improved. Specifically, a plurality of unit cells are designed to have different sizes, so that a unit cell with smaller cross-section can be disposed within the through-hole of a unit cell with larger cross-section, thereby all the unit cells are arranged in a nested manner. Thus, a battery product with a high capacity and good heat dissipation is obtained, while the void volume in the through-hole of the unit cell is utilized effectively, so that the energy density of the battery product is also increased.

Advantageously, a maximum thickness of the core of each toroidal unit cell is not more than 35 mm. This can limit the maximum distance from the internal electrode sheets of the cell core to the thermal conductive surface of side wall of the cell, thereby to further facilitate heat dissipation via the thermal conductive surface of side wall that forms parts of the cell shell. Here, the thickness of the toroidal cell core refers to the size of the cell core spanning between its inner side wall and outer side wall. For example, if the cell core is a hollow cylinder, its thickness corresponds to the difference between its inner and outer radiuses. However, it should be noted that the maximum thickness of the core of the unit cell is not limited to be less than 35 mm, for instance, this maximum thickness can be appropriately increased to e.g. 50 mm in an application where merely a battery with relatively low rate is desired.

Advantageously, a gap between two adjacent unit cells is not less than 5 mm. This helps to improve the heat dissipation effect of the battery pack. Here, the gap between two adjacent unit cells refers to the minimum distance between the outer side wall of the unit cell with smaller cross-section of the two adjacent unit cells and the inner side wall of the unit cell with larger cross-section of the two adjacent unit cells. For instance, if the inner and outer side walls are both annular, the gap is equal to the difference between the outer radius of the outer side wall of the unit cell with smaller cross-section and the inner radius of the inner side wall of the unit cell with larger cross-section. However, it should be noted that the minimum distance is not limited to 5 mm or more; instead, it may even be 0 mm in an application where merely a battery with relatively low rate is desired, that is, the outer side wall of the unit cell with smaller cross-section of the two adjacent unit cells and the inner side wall of the unit cell with larger cross-section of the two adjacent unit cells are in intimate contact.

Advantageously, in an application where the requirement of heat dissipation is not so high, the outer side wall of one of two adjacent unit cells that is surrounded by the other unit cell may be coincident with the inner side wall of the other unit cell. The manufacture of the assembled battery can be thereby simplified.

Advantageously, heat dissipating fins are provided on the inner side wall and/or outer side wall of at least one of the unit cells, so as to facilitate heat dissipation via the surface of side wall of the unit cell shell.

Advantageously, heat dissipating fins are provided on the outer side wall of the whole assembled battery, i.e. on the outer side wall of the toroidal unit cell which has the largest cross-section and thereby surrounds all the other unit cells, and the overall outer contour of all the heat dissipating fins is configured as rectangular or square. This facilitates the arrangement of a plurality of assembled batteries, and thus it is possible to make full use of the spaces among the assembled batteries for disposing heat dissipating fins to enhance heat dissipation. Obviously, the overall outer contour of heat dissipating fins may also be configured to take any other suitable shapes according specific spatial arrangement requirements, such as triangle, trapezoid, or even irregular geometric shapes.

According to an advantageous embodiment of the invention, the plurality of unit cells are nested together detachably. Thereby a very flexible structure is provided, in which the number of the nested unit cells may be increased or decreased as required, so as to provide assembled batteries with different capacities.

According to another advantageous embodiment of the invention, the plurality of unit cells are connected integrally after being nested within one another. This may increase the mechanical strength of the whole battery pack. Advantageously, the opposed inner and outer side walls of two adjacent unit cells are fixedly connected via the heat dissipating fins. Hereby, on the one hand, an integral battery pack with increased mechanical strength can be obtained, on the other hand, effective heat dissipation may be realized.

Advantageously, the toroidal unit cell is a hollow cylinder. The battery pack thus obtained may have a simple structure, and may be easily manufactured and assembled. However, the invention is not limited to this. Instead, the unit cell may be of any suitable shape. For example, the unit cell may also be a hollow prism (i.e. a hollow prism with a polygonal cross-section), such as a hollow cuboid. Correspondingly, the solid unit cell may be a solid cylinder or a solid prism.

Advantageously, a center line of the through-hole of the toroidal unit cell is coincident with a geometric center line of the unit cell, wherein the through-hole may be a circular hole, a polygonal hole, or a hole of any other suitable shape. For instance, when the toroidal unit cell is a hollow cylinder, its through-hole may be a circular hole coaxial with the center axis of the cylinder. This configuration can generally reduce the maximum distance from the internal electrode sheets to the adjacent thermal conductive surface of side wall of the unit cell to a greater extent, so as to obtain a better heat dissipation via the thermal conductive surface of side wall of the unit cell; this may also facilitate assembly of the shell and core, and may help the cell core to abut against the shell tightly with more uniform stress distribution when the core expands after absorbing electrolyte, so as to reduce the torsional force applied to the shell and protect the cell better.

According to an advantageous embodiment of the invention, the unit cell is lithium-ion cell. However, the invention is not limited to this, and other types of unit cells, such as nickel hydride cell, nickel-cadmium cell, etc., may also be employed.

Another aspect of the invention relates to a cell with improved heat dissipation performance which can be used in the assembled battery of the invention, characterized in that, the cell has a through-hole and is of toroidal shape, the cell comprising an inner side wall defining the through-hole, an outer side wall defining an outer circumference of the cell, and a core between the inner side wall and the outer side wall, and the inner side wall and/or the outer side wall is a double-wall structure including two shell walls, the two shell walls being connected integrally via heat dissipating fins.

As the inner side wall and/or the outer side wall of the cell is a double-wall structure including two shell walls that are connected integrally via heat dissipating fins, the heat dissipation via the side wall of the cell may be further improved, and it is possible to electrically connect a plurality of the cells in parallel as involved in the invention at any time as required, so as to achieve the object of capacity upgrade freely.

Advantageously, one of the inner side wall and the outer side wall of the cell is the double-wall structure, while the other is provided with heat dissipating fins. Or alternatively, both the inner side wall and the outer side wall are the double-wall structure.

Furthermore, the above cell may have the same features as the unit cell in the assembled battery according to the invention. For example, the cell may be a hollow cylinder or hollow prism; a center line of the through-hole of the cell may be coincident with a geometric center line of the cell; and the cell may be a lithium-ion cell, and so on.

BRIEF DESCRIPTION OF THE DRAWINGS

Other features and advantages of the invention will be apparent from the following detailed description of the preferred embodiments of the assembled battery according to the invention and the toroidal cell usable in the assembled battery, shown as non-restrictive examples in the drawings, wherein.

The drawings are only for illustrative purpose and do not necessarily show the actual sizes. In order to make the drawings clearer or make some parts noticeable, it is possible to magnify some parts relative to other parts; furthermore, corresponding parts in respective embodiments and drawings are indicated by identical reference signs.

DETAILED DESCRIPTION OF THE INVENTION

The comparative example and several embodiments of the invention will be described below in conjunction with the drawings. In the comparative example and in all the embodiments, the same slurry and current collector of positive and negative electrode sheets are used, the same coating process and dry process are employed for producing the positive and negative electrode sheets, and the same metallic materials are used for forming the cell shell. The material of the positive electrode is lithium manganate, the material of the negative electrode is natural graphite, and the metallic material used for the cell shell is aluminum or stainless steel. In the comparative example and the embodiments, the core of the unit cell of the assembled battery or battery pack may be formed of a single positive electrode sheet, a single negative electrode sheet and a separator by a winding process, or be formed of a plurality of positive electrode sheets, a plurality of negative electrode sheets and separators by a laminating process, or be formed by connecting a plurality of electrical cores with low capacity in parallel. That is, in the assembled battery of the invention, cell core of various structures in the prior art may be employed as the cores of the unit cells, thereby exhibiting great adaptability and wide applicability. In addition, the comparative example and the embodiments will be described with the lithium-ion power cell as an example.

Figure 1:
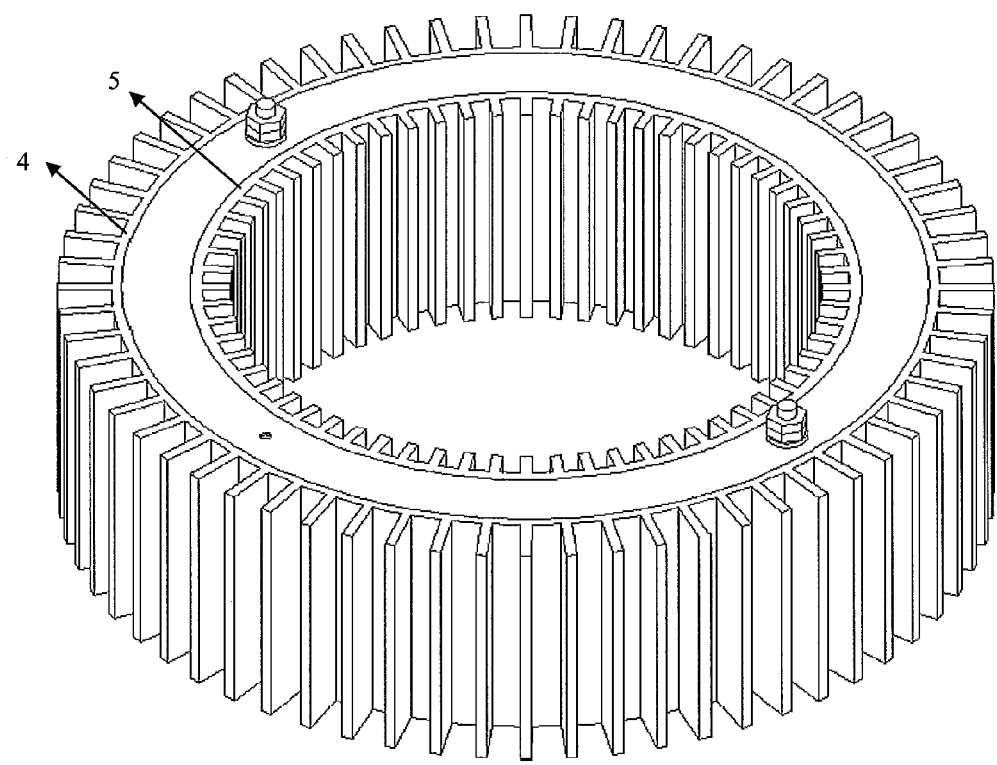
FIG. 1 shows a schematic perspective view of a 600 Ah toroidal power unit cell with a through-hole according to a comparative example.

FIG. 1 schematically shows a lithium-ion battery of a comparative example designed by the inventor of the invention. The lithium-ion battery of the comparative example is a 600 Ah toroidal power unit cell with a through-hole. This toroidal power unit cell is a hollow cylinder, has an outer diameter of 590 mm, an inner diameter (i.e., the diameter of the through-hole) of 525 mm, and a height of 180 mm. Heat dissipating fins are provided both on the outer side wall 4 of the battery shell and the inner side wall 5 defining the through-hole, and the distance between the outer side wall 4 and the inner side wall 5, i.e., the thickness of the battery core is 32.5 mm. The battery of this comparative example has a maximum diameter (including the heat dissipating fins) of 615 mm, and an energy density of 41.54 Wh/L.

Figure 2:
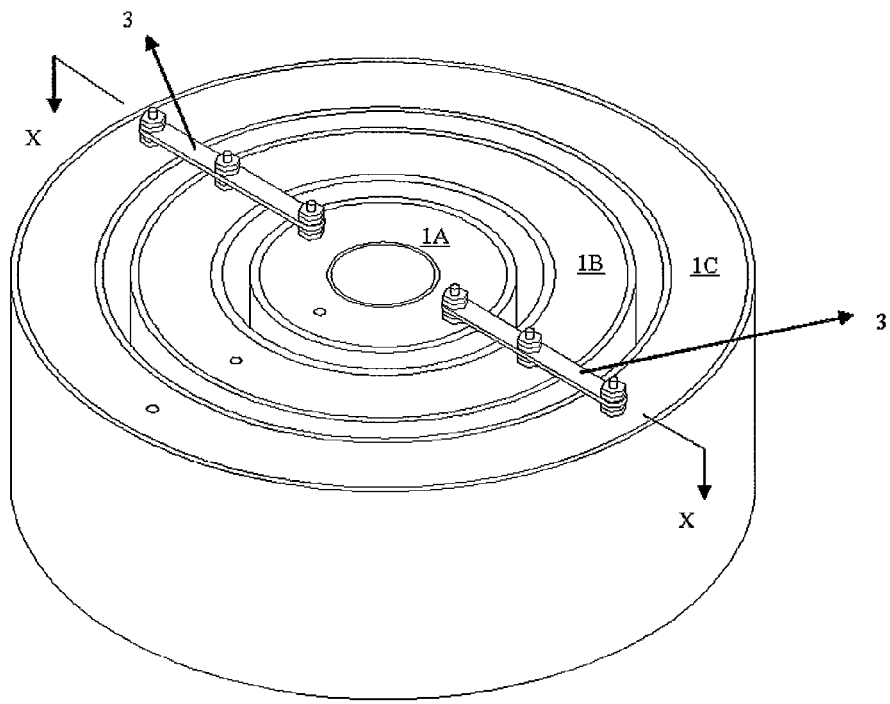
FIG. 2 shows a schematic perspective view of a 600 Ah assembled power battery according to a first embodiment of the invention.
Figure 3:
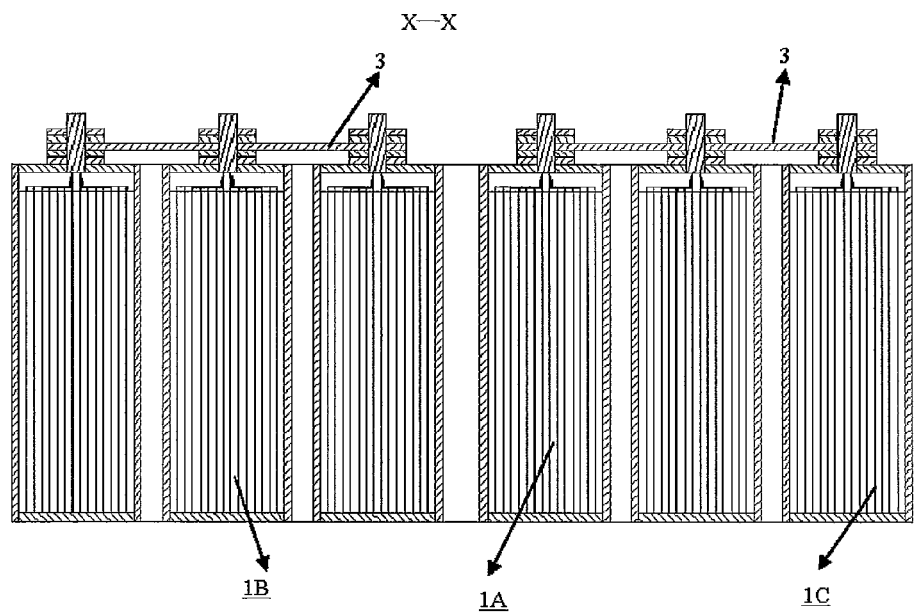
FIG. 3 shows a sectional view, taken along the line X-X, of the assembled battery in FIG. 2.

FIG. 2 schematically shows a 600 Ah lithium-ion assembled power battery according to a first embodiment of the invention. FIG. 3 shows a sectional view, taken along line X-X, of the assembled battery in FIG. 2. As shown in FIGS. 2-3, the assembled battery includes three hollow cylindrical toroidal unit cells that are connected in parallel via terminal post conductive connecting pieces 3. These three unit cells are nested within one another in the following order (from inner side to outer side): a toroidal lithium-ion power unit cell 1A with a capacity of 100 Ah, an outer diameter of 125 mm, an inner diameter of 60 mm, and a height of 180 mm; a toroidal lithium-ion power unit cell 1B with a capacity of 200 Ah, an outer diameter of 215 mm, an inner diameter of 150 mm, and a height of 180 mm; and a toroidal lithium-ion power unit cell 1C with a capacity of 300 Ah, an outer diameter of 305 mm, an inner diameter of 240 mm, and a height of 180 mm. The maximum thickness of the core for each of the three toroidal lithium-ion power unit cells 1A, 1B and 1C is 32.5 mm, the gap between them (i.e., the smallest distance between the opposed inner and outer side walls of two adjacent cells) is 12.5 mm, and no heat dissipating fins are provided on the inner side wall and the outer side wall of the unit cells. The energy density of the assembled battery of the present embodiment is 168.95 Wh/L, which is 4.07 times as large as that of the battery of the comparative example. The assembled battery of the present embodiment is applicable to situations where the charge/discharge rate is not greater than 15C.

Figure 4:
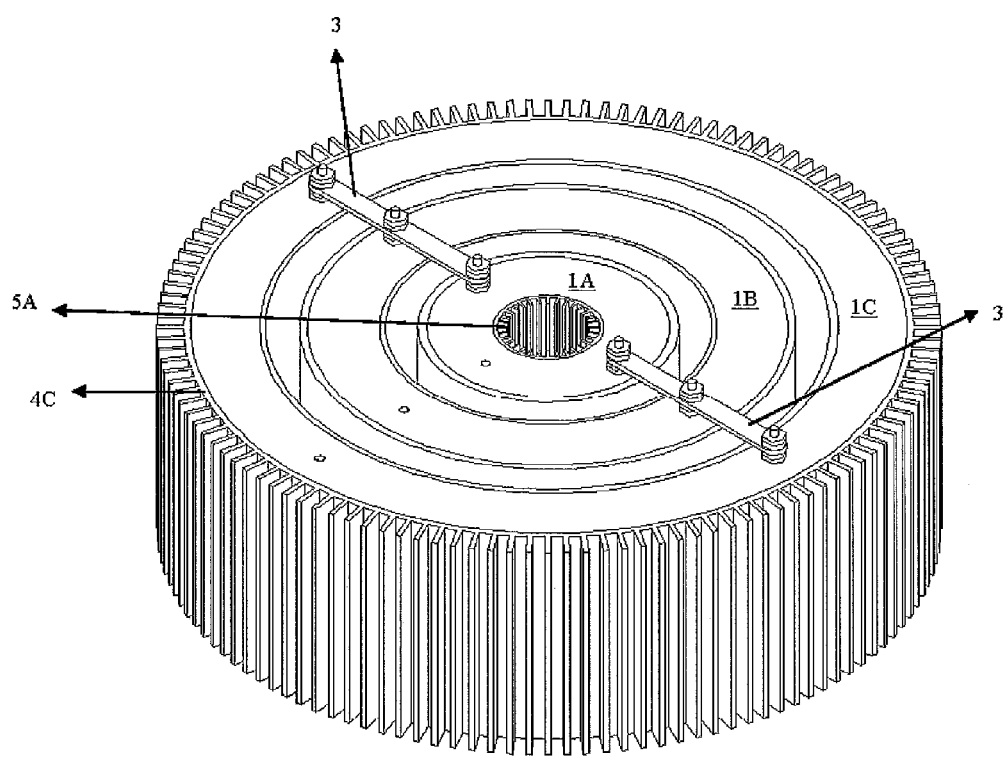
FIG. 4 shows a schematic perspective view of a 600 Ah assembled power battery according to a second embodiment of the invention.

FIG. 4 schematically shows a 600 Ah lithium-ion assembled power battery according to a second embodiment of the invention. The structure of this assembled battery is substantially the same as that of the first embodiment shown in FIGS. 2-3, and the difference lies in that: heat dissipating fins are provided on the surface of the inner side wall 5A of the toroidal lithium-ion power unit cell 1A and on the surface of the outer side wall 4C of the toroidal lithium-ion power unit cell 1C. The assembled battery of this embodiment has a maximum diameter (including the heat dissipating fins) of 330 mm, and an energy density of 144.25 Wh/L when taking account of the heat dissipating fins, which is 3.47 times as large as that of the battery of the comparative example. With strengthening ventilation, the assembled battery of this embodiment is applicable to situations where charge/discharge rate is not greater than 20C.

Figure 5:
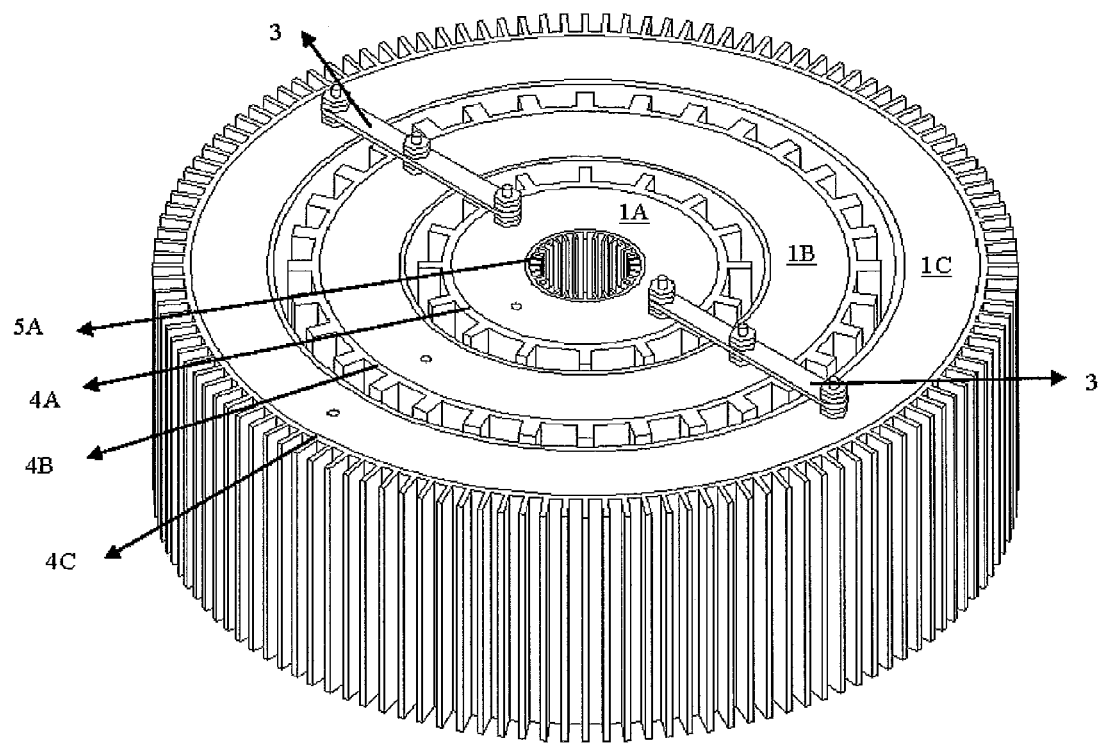
FIG. 5 shows a schematic perspective view of a 600 Ah assembled power battery according to a third embodiment of the invention.

FIG. 5 schematically shows a 600 Ah lithium-ion assembled power battery according to a third embodiment of the invention. The structure of this assembled battery is also substantially the same as that of the first embodiment shown in FIGS. 2-3, and the difference lies in that: heat dissipating fins are provided on the surfaces of the outer side wall 4A and the inner side wall 5A of the toroidal lithium-ion power unit cell 1A, on the surface of the outer side wall 4B of the toroidal lithium-ion power unit cell 1B, and on the surface of the outer side wall 4C of the toroidal lithium-ion power unit cell 1C. The assembled battery of this embodiment has an energy density of 144.25 Wh/L when taking account of the heat dissipating fins, which is 3.47 times as large as that of the battery of the comparative example. With strengthening ventilation, the assembled battery of this embodiment is applicable to situations where charge/discharge rate is not greater than 30C.

Figure 6:
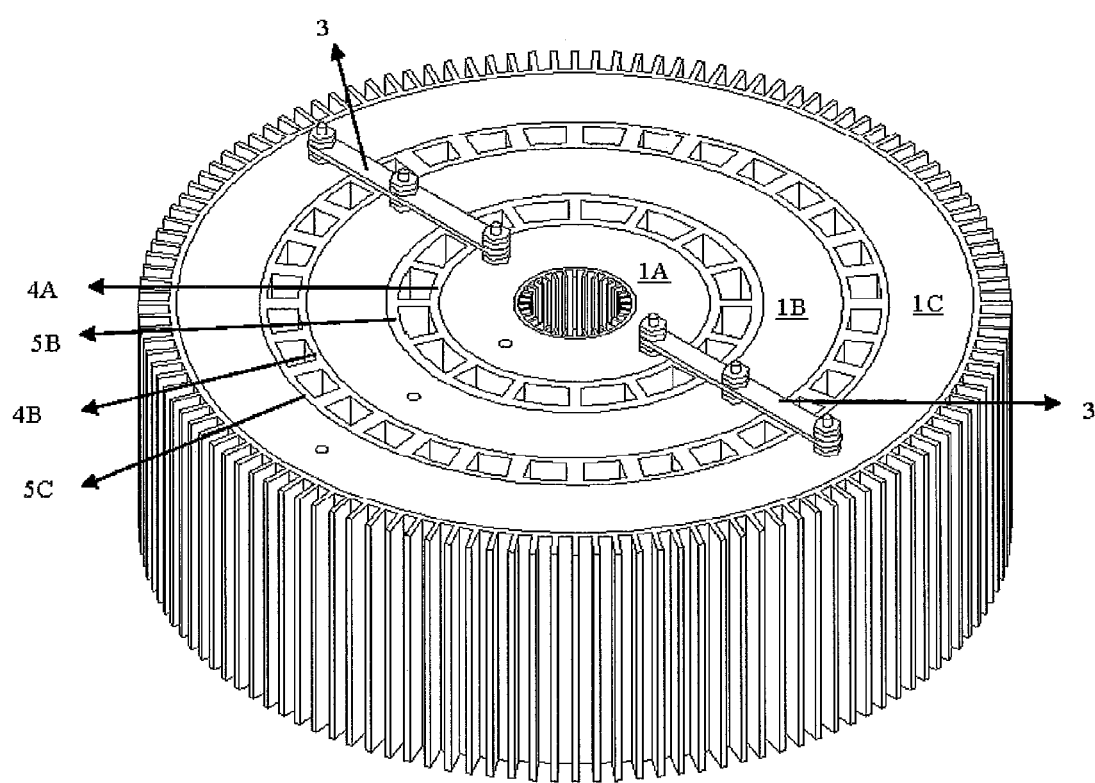
FIG. 6 shows a schematic perspective view of a 600 Ah assembled power battery according to a fourth embodiment of the invention.

FIG. 6 schematically shows a 600 Ah lithium-ion assembled power battery according to a fourth embodiment of the invention. The structure of this assembled battery is substantially the same as that of the third embodiment shown in FIG. 5, and the difference lies in that: the outer side wall 4A of the toroidal lithium-ion power unit cell 1A and the inner side wall 5B of the toroidal lithium-ion power unit cell 1B are fixedly connected integrally via heat dissipating fins; the outer side wall 4B of the toroidal lithium-ion power unit cell 1B and the inner side wall 5C of the toroidal lithium-ion power unit cell 1C are fixedly connected integrally via heat dissipating fins. The assembled battery of this embodiment has an energy density of 144.25 Wh/L when taking account of the heat dissipating fins, which is 3.47 times as large as that of the battery of the comparative example. With strengthening ventilation, the assembled battery of this embodiment is applicable to situations where charge/discharge rate is not greater than 30C.

Figure 7:
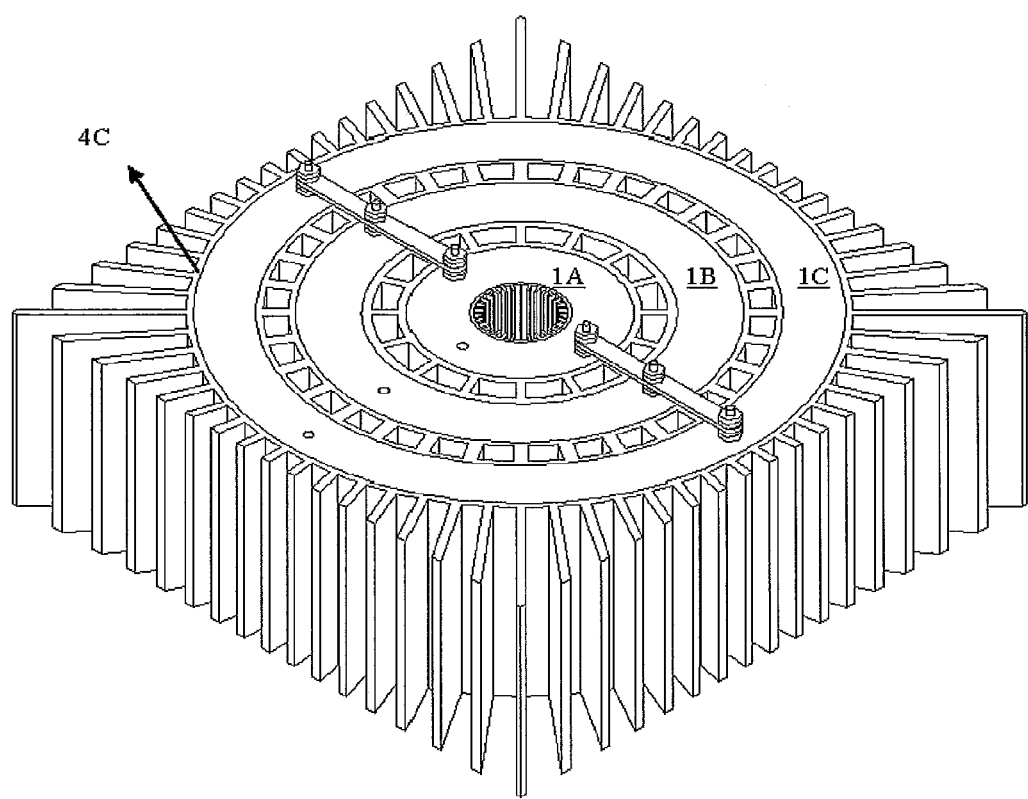
FIG. 7 shows a schematic perspective view of a 600 Ah assembled power battery according to a fifth embodiment of the invention.

FIG. 7 schematically shows a 600 Ah lithium-ion assembled power battery according to a fifth embodiment of the invention. The structure of this assembled battery is substantially the same as that of the fourth embodiment shown in FIG. 6, and the difference lies in that: the overall outer contour formed by all the heat dissipating fins on the outer side wall 4C of the toroidal lithium-ion power unit cell 1C is configured as a square shape. This facilitates the arrangement of a plurality of assembled batteries, and thus it is possible to make full use of the spaces among the assembled batteries for disposing heat dissipating fins to enhance heat dissipation. The assembled battery of this embodiment, taking account of the exterior heat dissipating fins, has a size of 320 mm×320 mm and an energy density of 120.4 Wh/L. With strengthening ventilation, the assembled battery of this embodiment is applicable to situations where charge/discharge rate is not greater than 30C.

Figure 8:
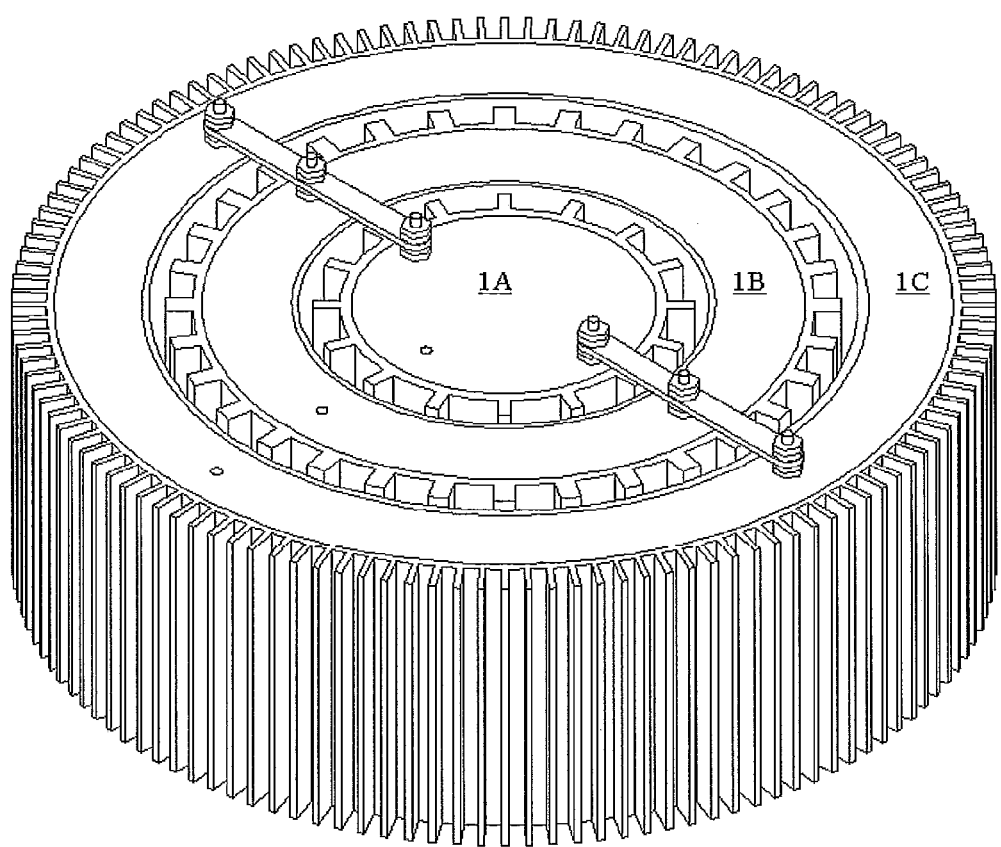
FIG. 8 shows a schematic perspective view of a 600 Ah assembled power battery according to a sixth embodiment of the invention.

FIG. 8 schematically shows a 600 Ah lithium-ion assembled power battery according to a sixth embodiment of the invention. The assembled battery of this embodiment also includes three unit cells that are nested within one another in the following order (from inner side to outer side): a solid unit cell 1A with a diameter of 100 mm, a height of 180 mm, a capacity of 100 Ah, and a maximum heat conductive distance of 25 mm; a toroidal unit cell 1B with an inner diameter of 110 mm, an outer diameter of 180 mm, a capacity of 200 Ah, and a maximum heat conductive distance of 17.5 mm; and a toroidal unit cell 1C with an inner diameter of 190 mm, an outer diameter of 255 mm, a capacity of 300 Ah, and a maximum heat conductive distance of 16.25 mm. As shown in FIG. 8, except that the innermost unit cell 1A is a solid unit cell, this assembled battery is similar to that of the third embodiment both in structure and in arrangement of heat dissipating fins. The assembled battery, taking account of the exterior heat dissipating fins, has a maximum diameter of 265 mm and an energy density of 223.7 Wh/L, and may be applicable to situations where maximum discharge rate is not greater than 4C.

Figure 9:
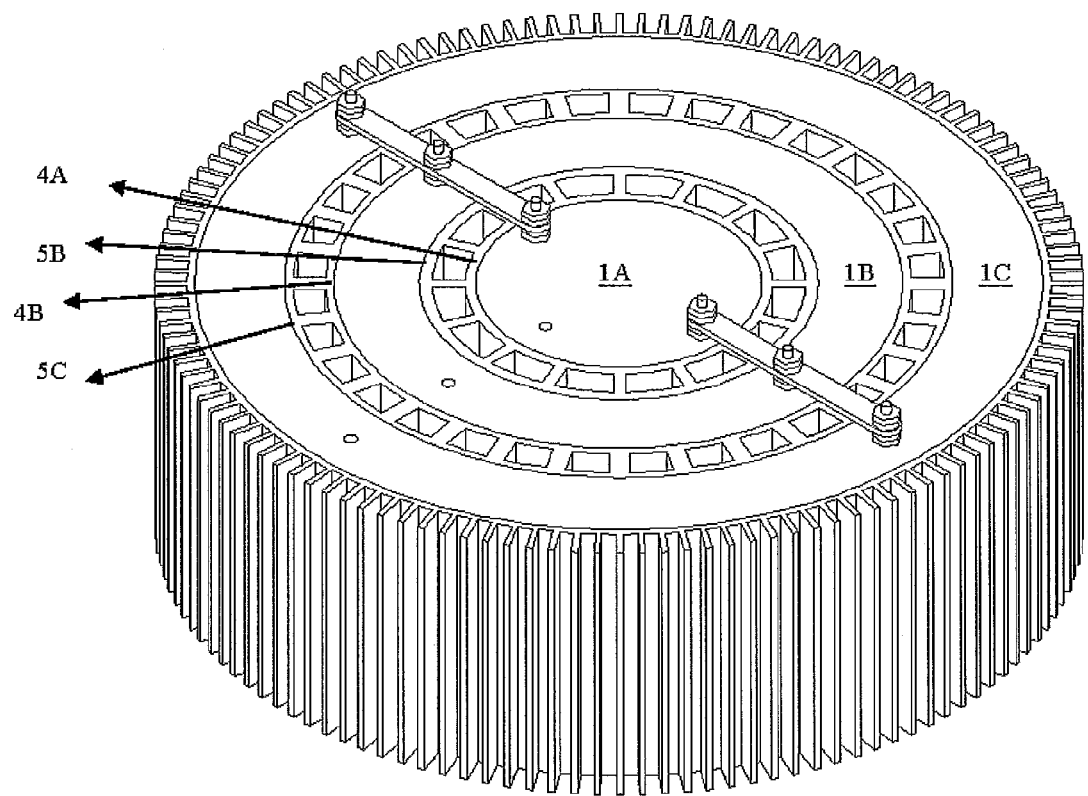
FIG. 9 shows a schematic perspective view of a 600 Ah assembled power battery according to a seventh embodiment of the invention.

FIG. 9 schematically shows a 600 Ah lithium-ion assembled power battery according to a seventh embodiment of the invention. The structure of this assembled battery is substantially the same as that of the sixth embodiment shown in FIG. 8, and the difference lies in that: the outer side wall 4A of the solid lithium-ion power unit cell 1A and the inner side wall 5B of the toroidal lithium-ion power unit cell 1B are fixedly connected integrally by heat dissipating fins; the outer side wall 4B of the toroidal lithium-ion power unit cell 1B and the inner side wall 5C of the toroidal lithium-ion power unit cell 1C are fixedly connected integrally by heat dissipating fins This assembled battery, taking account of the exterior heat dissipating fins, has a maximum diameter of 265 mm and an energy density of 223.7 Wh/L, and may be applicable to situations where maximum discharge rate is not greater than 4C.

Figure 10:
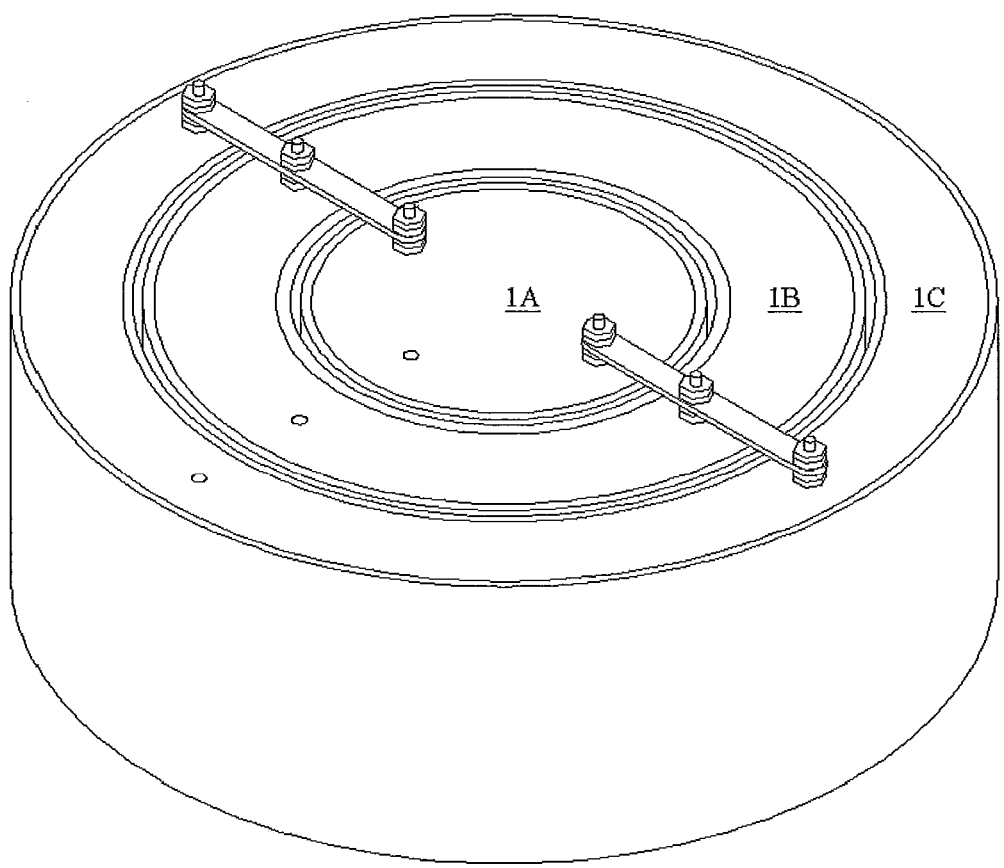
FIG. 10 shows a schematic perspective view of a 600 Ah assembled power battery according to an eighth embodiment of the invention.

FIG. 10 schematically shows a 600 Ah lithium-ion assembled power battery according to an eighth embodiment of the invention. The assembled battery of this embodiment also includes three unit cells that are nested within one another in the following order (from inner side to outer side): a solid unit cell 1A with a diameter of 100 mm, a height of 180 mm, a capacity of 100 Ah, and a maximum heat conductive distance of 25 mm; a toroidal unit cell 1B with an inner diameter of 102 mm, an outer diameter of 172 mm, a capacity of 200 Ah, and a maximum heat conductive distance of 17.5 mm; and a toroidal unit cell 1C with an inner diameter of 174 mm, an outer diameter of 240 mm, a capacity of 300 Ah, and a maximum heat conductive distance of 16.5 mm. No heat dissipating fins are provided on the outer and inner side walls of the three unit cells, while the gap between the respective unit cells is relatively small, only 2 mm. The assembled battery has an energy density of 272.8 Wh/L, and may be applicable to situations where maximum discharge rate is not greater than 2C.

Figure 11:
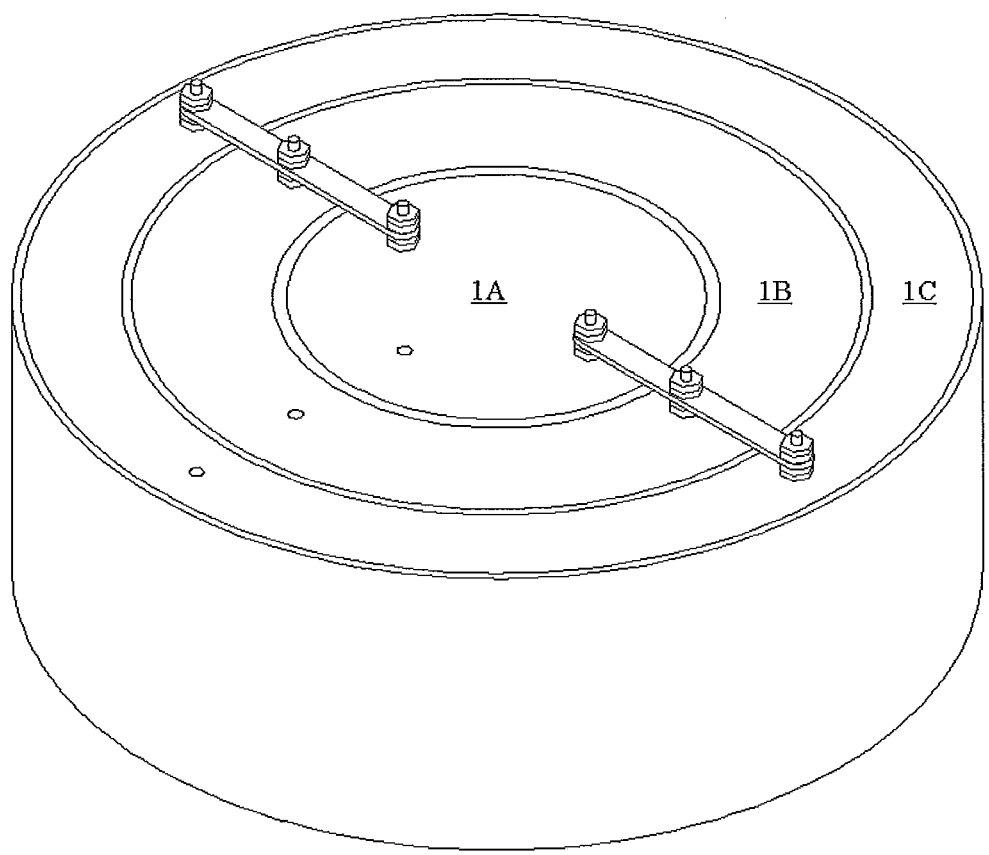
FIG. 11 shows a schematic perspective view of a 600 Ah assembled power battery according to a ninth embodiment of the invention.

FIG. 11 schematically shows a 600 Ah lithium-ion assembled power battery according to a ninth embodiment of the invention. The assembled battery of this embodiment also includes three unit cells that are nested within one another in the following order (from inner side to outer side): a solid unit cell 1A with a diameter of 100 mm, a height of 180 mm, a capacity of 100 Ah, and a maximum heat conductive distance of 25 mm; a toroidal unit cell 1B with an inner diameter of 100 mm, an outer diameter of 170 mm, a capacity of 200 Ah, and a maximum heat conductive distance of 17.5 mm; and a toroidal unit cell 1C with an inner diameter of 170 mm, an outer diameter of 236 mm, a capacity of 300 Ah, and a maximum heat conductive distance of 16.5 mm. As shown in FIG. 11, the outer side wall of the solid unit cell 1A coincides with the inner side wall of the toroidal unit cell 1B; the outer side wall of the toroidal unit cell 1B coincides with the inner side wall of the toroidal unit cell 1C; and no heat dissipating fins are provided on the outer side wall of the toroidal unit cell 1C. This assembled battery has an energy density of 282.1 Wh/L, and may be applicable to situations where maximum discharge rate is not greater than 1C.

In the first to the third, the sixth and the eighth embodiments as described above, the three unit cells in the assembled battery are nested and assembled together detachably. Thereby the number of the nested unit cells in the assembled battery may be increased or decreased as required, so as to provide assembled batteries with different capacities. For example, an assembled battery with a capacity of 400 Ah can be obtained by only connecting the unit cells 1A and 1C via terminal post conductive connecting pieces 3. In addition, besides electrical connection via terminal post conductive connecting pieces 3, the three unit cells can also be mechanically connected additionally by means of any other suitable means known in the prior art to enhance mechanical stability of the assembled battery. For example, a casing may be further disposed outside the assembled battery for accommodating this assembled battery to facilitate transportation and installation of the whole assembled battery.

In the fourth, the fifth and the seventh embodiments as described above, the inner and outer side walls of two adjacent lithium-ion power unit cells are fixedly connected integrally via heat dissipating fins. This improves the heat dissipation of the whole assembled battery, and also enhances the mechanical strength of the assembled battery, so that the structure of the whole assembled battery becomes more stable. For the ninth embodiment, two adjacent unit cells share one side wall, which also increases the mechanical strength of the assembled battery and facilitates the manufacture.

In addition, as compared with the comparative example, the energy density of the assembled battery is greatly increased in the above embodiments of the invention. Moreover, since heat dissipation performance of the assembled battery depends upon heat dissipation performance of the individual unit cells in the assembled battery, heat dissipation performance of the assembled battery may be ensured by appropriately setting the maximum thickness of the unit cells and/or gaps between respective unit cells, and/or by providing heat dissipating fins.

Figure 12:
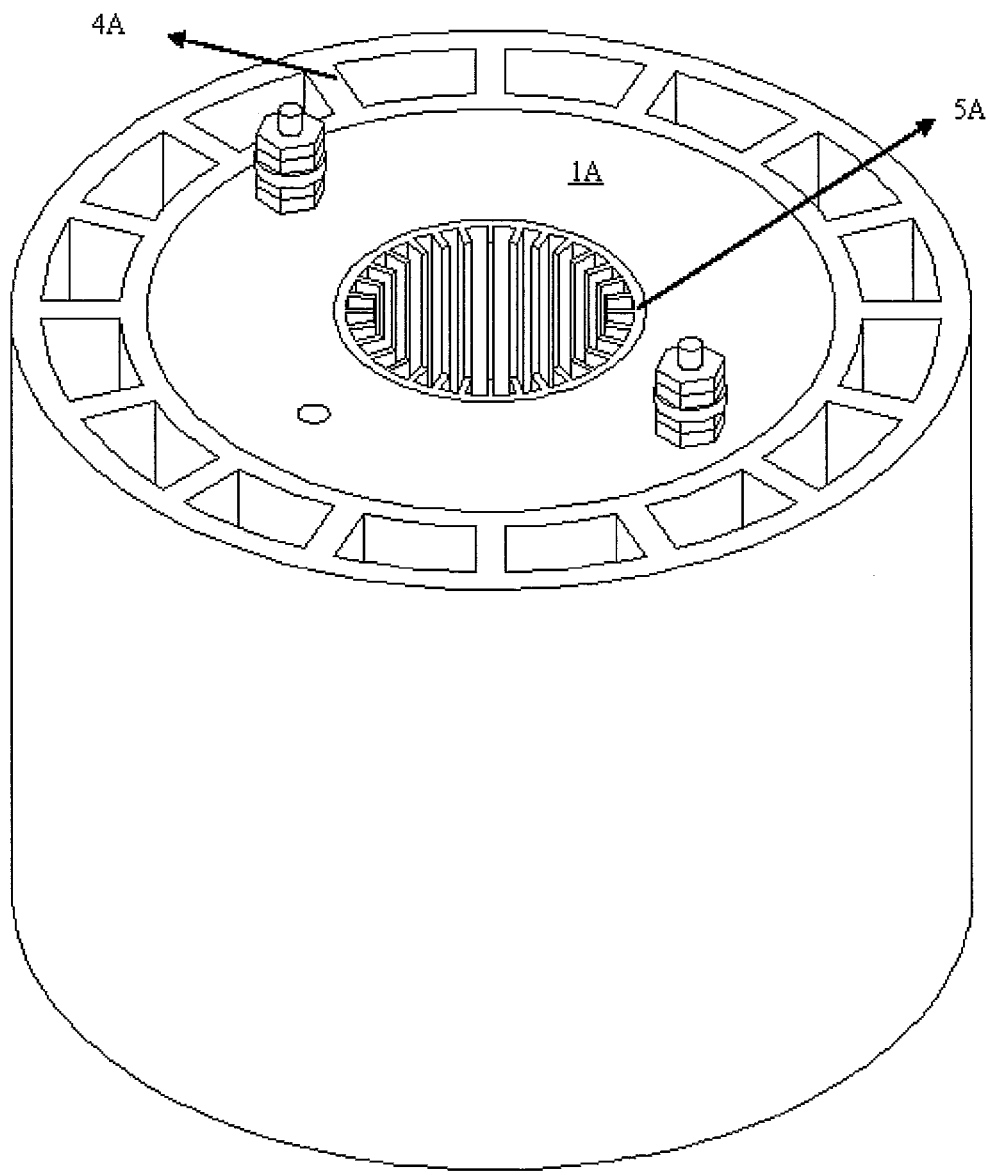
FIGS. 12-14 show schematic perspective views of three embodiments of the toroidal cell according to the invention usable in the assembled battery of the invention.
Figure 13:
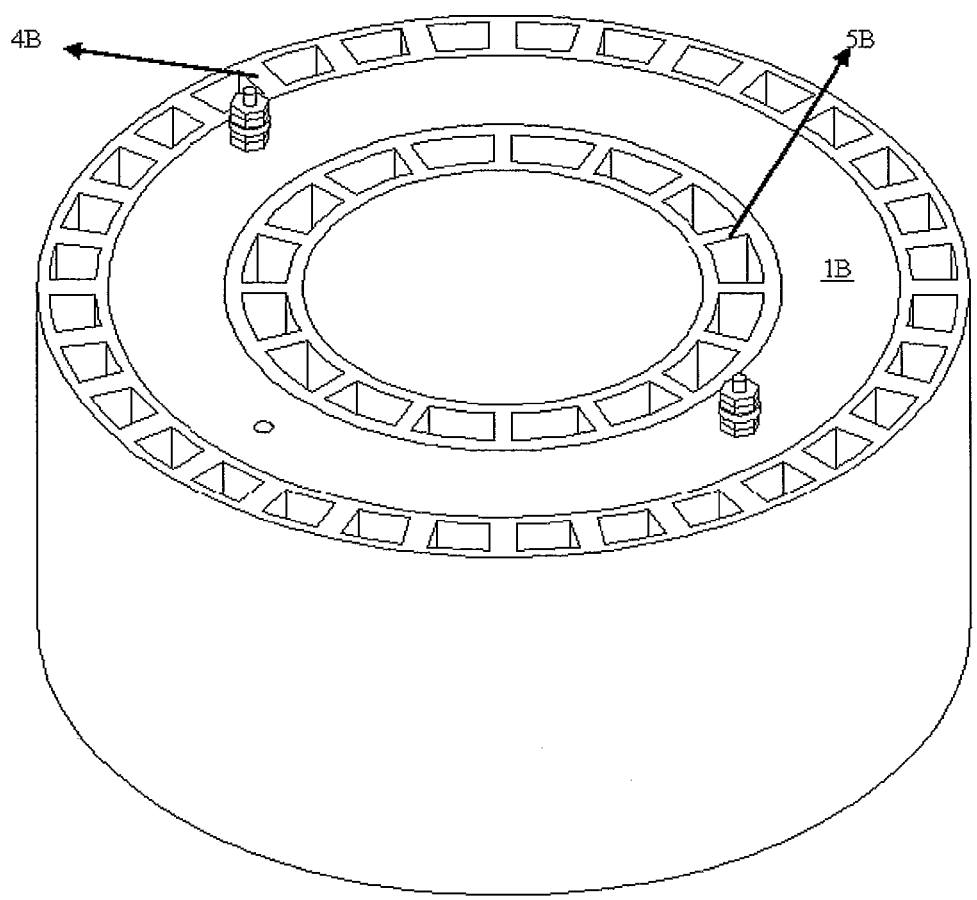
Figure 14:
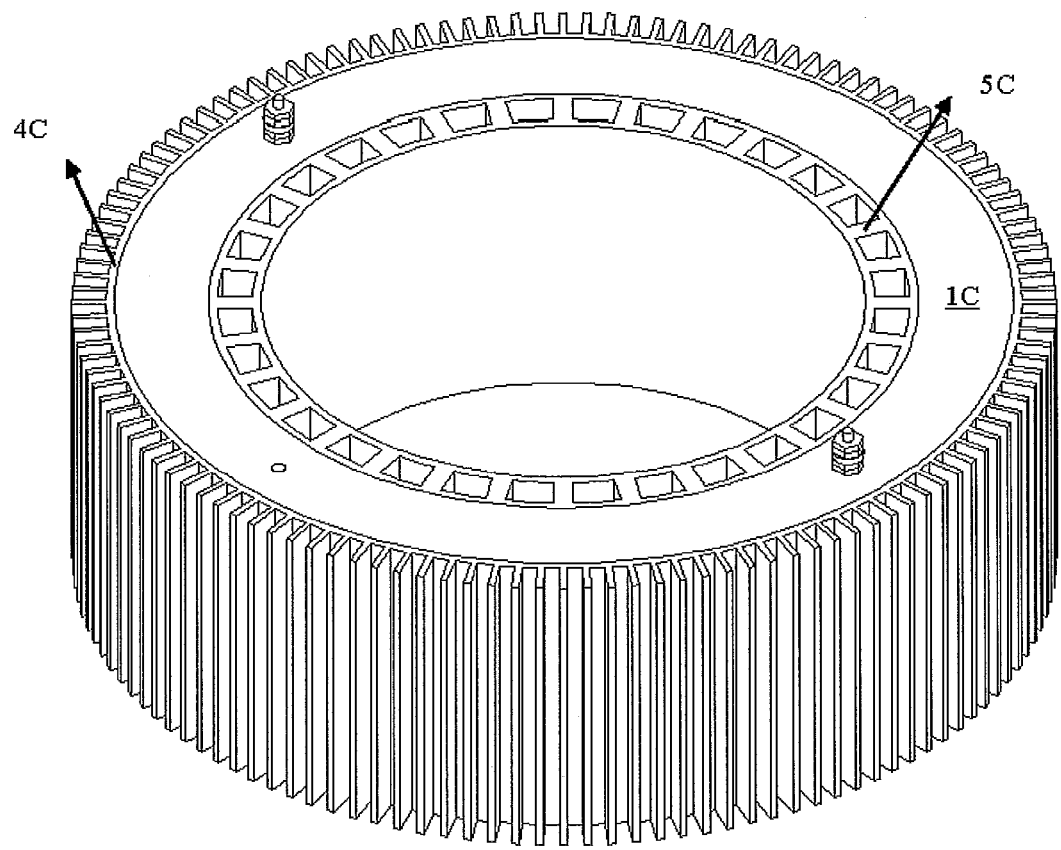

FIGS. 12-14 show schematic perspective views according to three embodiments of the toroidal unit cell applicable in the assembled battery of the invention. Each of the illustrated three toroidal unit cells is a hollow cylinder, and characterized in that the inner side wall and/or the outer side wall is a double-wall structure including two shell walls that are connected integrally via heat dissipating fins. As shown in FIG. 12, the outer side wall 4A of the toroidal cell 1A is the double-wall structure, and the inner side wall 5A is provided with heat dissipating fins; as shown in FIG. 13, both the outer side wall 4B and the inner side wall 5B of the toroidal cell 1B are the double-wall structure; and as shown in FIG. 14, the inner side wall 5C of the toroidal cell 1C is the double-wall structure, and the outer side wall 4C is provided with heat dissipating fins. Obviously, it is also possible not to provide heat dissipating fins on the side wall that is not the double-wall structure. Due to employment of the double-wall structure, the heat dissipation effect via the side walls of the three toroidal unit cells may be further improved, and these three toroidal unit cells may be applied to e.g. the assembled battery according to the fourth embodiment of the invention, and may be electrically connected as required with other unit cells in parallel as involved in the invention, so as to achieve the object of capacity upgrade freely.

Although the invention has been described in detail with reference to the specific embodiments hereinabove, a person skilled in the art should understand that, the invention is not limited thereto, and various modifications, substitutions and variations easily conceivable by a person skilled in the art according to teaching of the disclosure of the invention fall within the scope of protection of the invention. For example, in the assembled battery according to the invention, a plurality of toroidal unit cells may have different heights, different maximum thicknesses, different shapes and so on. In addition, the maximum thickness of a toroidal unit cell as well as the gap between adjacent unit cells can be appropriately set as desired to obtain a suitable balance between energy density and heat dissipation performance. The number of the nested unit cells in the assembled battery is also not limited to three as described in the above embodiments, and it may be two, four or more as required; the capacity of various unit cells in the assembled battery is not limited to the specific values in the above embodiments, and unit cells with various capacities may be used as required. In addition, in the assembled battery according to the invention, the arrangement of heat dissipating fins is not limited to those in the above embodiments; instead, heat dissipating fins may be disposed on the entire or part of the surface of any selected inner side wall and/or outer side wall of one or more unit cells as desired according to practical requirement and specific application. The scope of protection of the invention is indicated specifically by the appended claims.

The invention claimed is:

1. An assembled battery comprising a plurality of unit cells electrically connected with one another in parallel, wherein the plurality of unit cells are arranged in a nested manner such that one unit cell is disposed within another unit cell, each of the plurality of unit cells is a toroidal unit cell having a through-hole each toroidal unit cell comprising an inner side wall defining the through-hole, an outer side wall defining an outer circumference of the toroidal unit cell, and a core between the inner side wall and the outer side wall, the plurality of toroidal unit cells are arranged in a nested manner such that one toroidal unit cell is disposed within the through-hole of another toroidal unit cell and the opposed inner and outer side walls of two ad adjacent unit cells are fixedly connected via heat dissipating fins.

2. The assembled battery according to claim 1, wherein a maximum thickness of the core of each toroidal unit cell is less than or equal to 35 mm.

3. The assembled battery according to claim 1, wherein a gap between two adjacent unit cells is greater than or equal to 5 mm.

4. The assembled battery according to claim 1, wherein heat dissipating fins are provided on the inner side wall of the innermost toroidal cell and/or outer side wall of the outermost toroidal cell.

5. The assembled battery according to claim 1, wherein the toroidal unit cell is a hollow cylinder or hollow prism, and a center line of the through-hole of the toroidal unit cell is coincident with a geometric center line of the toroidal unit cell.

6. The assembled battery according to claim 1, wherein the unit cell is lithium-ion cell.

7. The assembled battery according to claim 1, wherein the core of the unit cell is formed of a positive electrode sheet, a negative electrode sheet and a separator by a winding process or laminating process.

8. The assembled battery according to claim 1, wherein the core of the unit cell is formed by connecting a plurality of electrical cores in parallel.

9. An assembled battery comprising a plurality of unit cells electrically connected with one another in parallel, wherein the plurality of unit cells are arranged in a nested manner such that one unit cell is disposed within another unit cell, the plurality of unit cells include a solid unit cell, and one or more toroidal unit cells surrounding the solid unit cell and each toroidal unit cell having a through-hole, the solid unit cell comprising a core and an outer side wall defining an outer circumference of the solid unit cell, the toroidal unit cell comprising an inner side wall defining the through-hole, an outer side wall defining an outer circumference of the toroidal unit cell, and a core between the inner side wall and the outer side wall, the solid unit cell and the one or more toroidal unit cells are arranged in a nested manner such that one unit cell is disposed within the through-hole of another unit cell and the opposed inner and outer side walls of two adjacent unit cells are fixedly connected via heat dissipating fins.

10. The assembled battery according to claim 9, wherein a maximum thickness of the core of each toroidal unit cell is less than or equal to 35 mm.

11. The assembled battery according to claim 9, wherein a gap between two adjacent unit cells is greater than or equal to 5 mm.

12. The assembled battery according to claim 9, wherein heat dissipating fins are provided on the inner side wall of the innermost toroidal cell and/or outer side wall of the outermost toroidal cell.

13. The assembled battery according to claim 9, wherein the toroidal unit cell is a hollow cylinder or hollow prism, and the solid unit cell is a corresponding solid cylinder or a corresponding solid prism, and a center line of the through-hole of the toroidal unit cell is coincident with a geometric center line of the toroidal unit cell.

14. The assembled battery according to claim 9, wherein the unit cell is lithium-ion cell.

15. The assembled battery according to claim 9, wherein the core of the unit cell is formed of a positive electrode sheet, a negative electrode sheet and a separator by a winding process or laminating process.

16. The assembled battery according to claim 9, wherein the core of the unit cell is formed by connecting a plurality of electrical cores in parallel.

\* \* \* \* \*